Dec. 29, 1953
G. L. WHITE
2,663,973
APPARATUS FOR CULTIVATING COTTON
AND CONTROLLING NOXIOUS WEEDS
Filed Oct. 13, 1950
5 Sheets-Sheet 1

Inventor
Godfrey Llewellyn White

By Clarence A. O'Brien
and Harvey B. Jacobson
Attorneys

Inventor
Godfrey Llewellyn White

Dec. 29, 1953

G. L. WHITE

2,663,973

APPARATUS FOR CULTIVATING COTTON
AND CONTROLLING NOXIOUS WEEDS

Filed Oct. 13, 1950

Inventor
Godfrey Llewellyn White

By Clarence A. O'Brien
and Harvey B. Jacobson
Attorneys

Dec. 29, 1953

G. L. WHITE 2,663,973

APPARATUS FOR CULTIVATING COTTON
AND CONTROLLING NOXIOUS WEEDS

Filed Oct. 13, 1950

Inventor

Godfrey Llewellyn White

By Clarence A. O'Brien
and Harvey B. Jacobson
Attorneys

Patented Dec. 29, 1953

2,663,973

UNITED STATES PATENT OFFICE 2,663,973

APPARATUS FOR CULTIVATING COTTON AND CONTROLLING NOXIOUS WEEDS

Godfrey Llewellyn White, Osceola, Ark.

Application October 13, 1950, Serial No. 189,987

12 Claims. (Cl. 47—1)

This invention relates to an apparatus for cultivating cotton and simultaneously controlling noxious weeds.

It is well known in the art that as soon as the cotton seeds are planted in rows, weeds begin to appear in and between the rows which not only grow rapidly and make it difficult to properly cultivate the cotton but also compete with the cotton for the nutrient substances in the soil. Therefore, the problem of controlling weeds is present with the cotton planter from the very time the seeds are planted to the time that the cotton is picked. It is an important object of this invention to provide a method of controlling noxious weeds which can be applied to very young cotton as low as one inch high which will insure sturdy growth of the cotton, reduce the competition between the young cotton and the surrounding weeds for soil nutrition, will permit the early application of fertilizer to the soil, and will simplify the subsequent care and cultivation of the cotton.

It is also well known in the art that while it is difficult to control and eradicate proliferous annual weeds, it is far more difficult to control and eradicate hardy perennial weeds, particularly such a perennial weed as Johnson grass which has both a proliferating type of foliage and a thick and extensive root system. It is therefore, an important object of this invention to provide an apparatus and method for controlling all types of weeds including the recalcitrant perennial weeds which conventionally plague growing cotton.

It is further well known in the art that very potent herbicides must be employed to effectively control and eradicate the troublesome perennial weeds and some of the more prolific annual weeds. The herbicides to be effective must be translocated within a relatively short time to the root system of the weeds for complete and effective eradication. Because of this, the natures of the herbicides employed are generally quite toxic to the cotton plants in the row or drill so that with the conventional methods of applying the herbicides, many of the cotton plants as well as the surrounding weeds are concurrently destroyed. It is, therefore, another important object of this invention to provide an apparatus and method which will very effectively control all types of weeds and which will simultaneously shield the more sensitive portions of the cotton plants in the rows so that the destruction of the cotton plants will be materially reduced or entirely eliminated.

It is another important object of this invention to provide an apparatus and method for controlling weeds in cotton which will effect a marked economy in the quantity of herbicides employed since the method contemplates the simultaneous spraying of weeds in and immediately adjacent the rows or drills and the plowing up of the weeds between the rows or drills. The method contemplates not only the plowing of the "middles" and the shielding of the sensitive portions of the cotton plants but also the leveling of a predetermined area on both sides of the row or drill and a shielding of this predetermined area to prevent the soil plowed up in the "middles" from being thrown into the row or drill.

It is a further important object of this invention to provide an apparatus for carrying out the above-described method which is relatively simple in design and construction, inexpensive, very easy to operate, very easy to assemble and disassemble from a prime mover, and extremely effective for its intended purpose.

Yet another object of this invention is to provide apparatus of the character described which can be operated with a minimum of manipulative skill, which can be operated with fair speeds without injuring the cotton plants in the rows, which is adjustable to the growing heights of the cotton plants, and which incorporates herbicide spraying means which is both vertically and angularly adjustable to accommodate the growing cotton plants.

These, together with various ancillary objects and features of the invention which will later become apparent as the following description proceeds, are attained by the device, a preferred embodiment of which has been illustrated by way of example only in the accompanying drawings, wherein.

Before going into the details of construction of the apparatus and the various modifications thereof, a detailed explanation of the method will be described.

Conventionally, cotton is planted in rows which are 36", 38" and 40" apart. The area between the rows is known as the "middles" and the present method comprises the simultaneous plowing of the "middles," the shielding of the sensitive portions of the cotton plants such as the buds and foliage, the controlled spraying of herbicides in the rows on the bottommost portions of the stems of the cotton plants and the leveling of a predetermined area on both sides of the cotton row. The area to be leveled on both sides of the rows should be preferably 5" to 6". However, when the "middles" are plowed clods of dirt and soil containing a multitude of weed seeds will be thrown up against the rows of cotton or into the cotton drills which will cause the germination and growth of weeds again within the 5" to 6" area on both sides of the cotton. Therefore, the leveling operation should also include a shielding or baffling operation which would prevent a substantial portion of the plowed clods of dirt and soil from being thrown into the cotton drills.

The method must be repeated several times during the growth of the cotton plants because of the existence of growing weeds in the cotton drills. Because the thrown clods form longitudinal ridges or mounds along both sides of the rows or drills, it is evident that these mounds or ridges must be leveled to make it possible to effectively spray the 5" to 6" area on both sides of the cotton drills or else the mounds or ridges will prevent the spray from falling on the bottommost portions of the stems of the cotton and immediately beneath the stems. The shielding step of the present process, therefore, not only protects the sensitive portions of the cotton plants but also prevents the deposition of a multitude of weed seeds in the cotton drills and since this shielding is carried on simultaneously with a leveling of a 5" to 6" area on both sides of the cotton drill, subsequent spraying of the herbicides can be effectively deposited upon the bottommost portions of the cotton stems. It has been found from practice that it takes an average of about three sprayings per season to effectively control the noxious weeds by the present method. The method effectively eradicates such perennial weeds as Johnson grass, nut grass and the like and since the method may be applied to young cotton as short as one inch high, it obviously effects a marked economy in time, labor, spraying fluid or herbicides, and entirely eliminates the conventional hand hoeing.

To effectively spray cotton with a herbicide which will kill the perennial weeds as well as the annual weeds, the cotton row or drill must be sprayed carefully under a particular spray pattern. A herbicide to be effective in the eradication of perennial weeds which have extensive foliage and thick and extensive root systems must be very potent and capable of being translocated to the root system of the weeds. Such a herbicide, because of its toxicity, will also destroy the cotton plants if it is deposited upon the cotton buds and the leaves thereof. While many herbicides may be employed with the present method, a particular herbicide comprising pentachlorophenol, n-butyl alcohol, carbon tetrachloride, and petroleum hydrocarbons has been found particularly effective.

Whatever the nature of the toxic herbicide employed, the same must be sprayed under a particular spray pattern so that the herbicide strikes the bottommost portions of the cotton stems containing the cutin. The spray pattern as shown clearly in Figures 12 to 15, and which will be described in detail later, is fan-shaped and overlaps partially on a horizontal plane as close to the ground above the drill as possible. If the overlapping is too great at the drill, too much herbicide will get on the cotton stems above the cutin and eventually injure and destroy the cotton plants. The pattern is vertically and angularly adjustable to conform with the growth of the cotton. When the cotton is approximately a month old and grows to a height of 4" to 8", a bark forms on the stem which splits. Therefore, the spray pattern must be changed to avoid spraying onto the split bark which would form a stricture around the stem. When this occurs the spray penetrates the bark or cortex and pericycle, enters the conducting tissue extending from the root cap to the terminal bud, and even penetrates the pith with the result that the cotton plant bends over at the stricture and dies off. Hence, the spray pattern must be changed from horizontal or lateral depositions to a somewhat vertical deposition. The pattern is such that it is still fan-shaped and overlapping at the drill but is inclined downwardly with the overlapping at the drill beneath the bark or cortex and pericycle.

Inasmuch as the spraying of cotton with the above method can be carried out with relatively young cotton and when the weeds themselves are young, it is possible to add fertilizer to the soil immediately after the first spraying which would cause the cotton plant to grow preferentially higher and in a shorter time than any of the weeds which may have remained uneradicated. Without the first spraying of young cotton, an immediate application of fertilizer would cause the weeds and cotton to grow rapidly and simultaneously making the subsequent eradication of full grown weeds very difficult.

The apparatus and some further details of the method will be described hereinafter in conjunction with the accompanying drawings. Indicated generally at 10 is a suitable prime mover, such as a Ford-Ferguson tractor, to which is secured at its rear end a cultivator frame 12 comprising a pair of spaced, parallel transversely extending angle bars 14 and 16. The cultivator frame is attached by suitable links 18 to a conventional raising and lowering mechanism 20. A transversely extending bar 22 is provided and extends transversely across the forward end of the prime mover 10 and is operatively connected by suitable link rods 24 to the linkage 18 securing the cultivator frame 12 so that actuation of the raising and lowering mechanism 20 will simultaneously raise and lower the cultivator frame 12 and the forward transverse bar 22. Secured by appropriate bolts and nuts to the cultivator frame bars 14 and 16 and spaced transversely of the prime mover are a plurality of plowshares 26 carrying conventional plows 28 which are longitudinally staggered as shown clearly in Figure 2.

Figure 5:
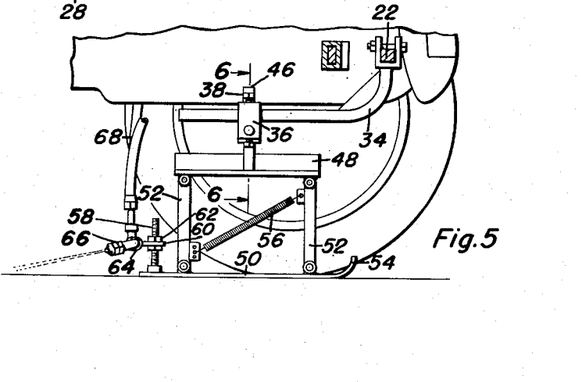
Figure 5 is an enlarged sectional view taken substantially on the plane of section line 5—5 of Figure 2.
Figure 6:
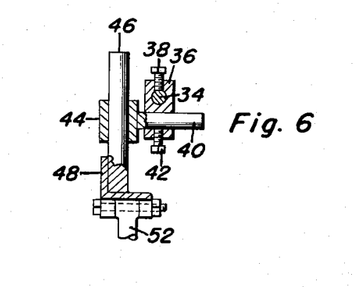
Figure 6 is a sectional view taken substantially on the plane of section line 6—6 of Figure 5.

Secured to the ends of the forward bar 22 between the front wheels 30 and the prime mover chassis 32 is a pair of adjustable spray shoes shown in detail in Figures 5 and 6 and fully described in applicant's co-pending application, Serial No. 97,429, filed June 6, 1949, entitled "Attachment for Controlling Weeds in Cotton, now Patent Number 2,530,145. Briefly, this spray shoe comprises an arcuate rod 34 suitably clamped to the transverse bar 22 and adjustably received in a collar 36 and retained therein by a suitable set screw 38. A short rod 40 is secured in the collar 36 by a set screw 42 which short rod includes a vertically extending collar 44 receiving a vertical rod 46 which is secured as by welding at its bottom end to an angle member 48. Terminally pivoted to the ends of the angle member 48 and to a shoe 50 are parallel-acting links 52. The links are parallel-acting to maintain the shoe 50 with its arcuate forward end 54 at all times parallel to the prime mover chassis throughout the forward movement of the prime mover. A diagonal compression spring 56 is secured between the links 52 to assist in returning the shoe 50 to its position parallel to the angle member 48 when the shoe rides over a mound.

Figure 1:
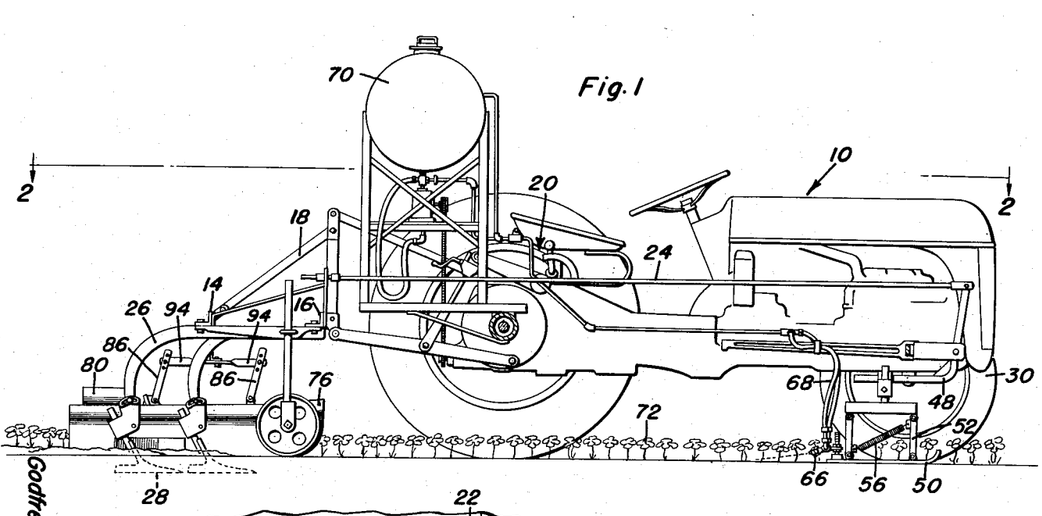
Figure 1 is a side elevational view of the device shown assembled upon a prime mover.

Secured to the rear end of each shoe 50 is a vertically extending threaded rod 58 which receives an apertured lug 60 held in position thereon by a suitable lock nut 62. The apertured lug 60 carries a collar 64 which receives a spray nozzle 66 which may be angularly adjusted in the collar 64 by a suitable set screw and the spray nozzle is connected by suitable valved conduits 68 to a reservoir 70 filled with a suitable weed killer, the reservoir 70 being appropriately secured upon the prime mover, as shown clearly in Figure 1. It should be noted that at the forward end of the prime mover 10, there are two pairs of spray shoes 50 which straddle the rows of cotton 72 so that the cotton plants in the row will be sprayed on both sides.

As clearly illustrated in Figures 1 to 6, a shielding and leveling device 74 is employed in conjunction with the vertical and angularly adjustable sprays carried at the forward end of the prime mover. This device comprises a plurality of arcuate shielding plates 76 disposed between the plows and adapted to loosely straddle or embrace a plurality of cotton plants in the rows 72, as shown clearly in the drawings. Each shield has an arcuate portion at its forward edge 78 to prevent injury to the cotton plants and also to prevent the shield from sticking into the soil as the shield is pulled along by the prime mover. A suitable counterweight 80 is secured as by welding to the rear upper edge of the shield to exert a downward force on the shield at the rear portion thereof.

The arcuate shielding plates 74 are suspended by means of parallel-acting links to the cultivator frame 12 in the following manner. Pivoted to lugs 84 at the top surface of the shield 74 is a pair of spaced parallel links 86 and 88. It should be noted that two longitudinally spaced lugs 84 are provided so that, in effect, there are two pairs of spaced bars 86 and 88 pivoted to the lugs substantially adjacent the rear and forward ends of the shielding plate 74. The upper ends of the links 86 and 88 are apertured as at 90 to adjustably receive pivot pins 92 which pivotally secure the ends of a horizontally extending bar 94 that is twisted intermediate its ends as at 96. Secured to the twisted end 96 of the bar 94 is an L-shaped bracket 98 which is in turn secured to another L-shaped bracket 100. The bracket 100 is secured by a suitable headed bolt and nut 102 to the angle member 14 of the frame 12. Thus it will be seen that the shield 74 is connected to the cultivator frame 12 by parallel-acting links in such a manner that when the shield rides over mounds, the entire shield will pivot upwardly and remain substantially parallel to the ground level at all times throughout the movement of the prime mover.

Secured as by welding to both sides of each shield 74 adjacent the bottom free edges thereof and preferably adjacent the rear edge of the shield is a vertically extending leveling plate 104, one portion 106 of which is secured to the side of the shield and one portion 108 of which is inclined rearwardly and outwardly from the shield. Thus it will be seen that each shield includes vertically extending, rearwardly divergent plates which serve to level the plowed soil a predetermined distance on both sides of the cotton row 72.

Figure 2:
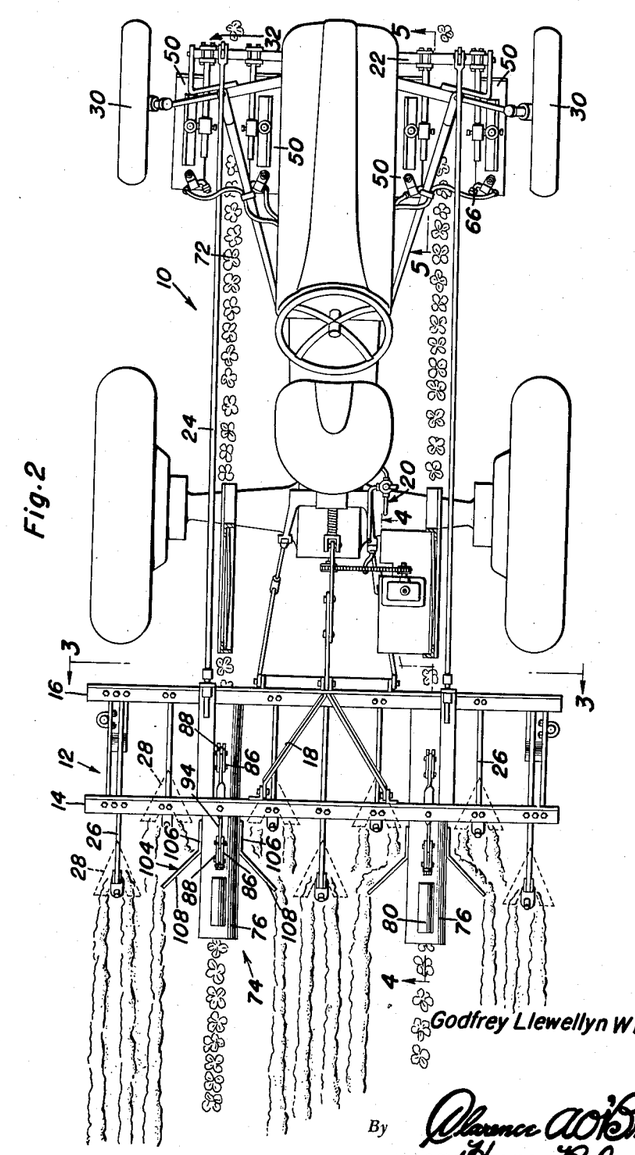
Figure 2 is a top plan view of the device shown in Figure 1.
Figure 3:
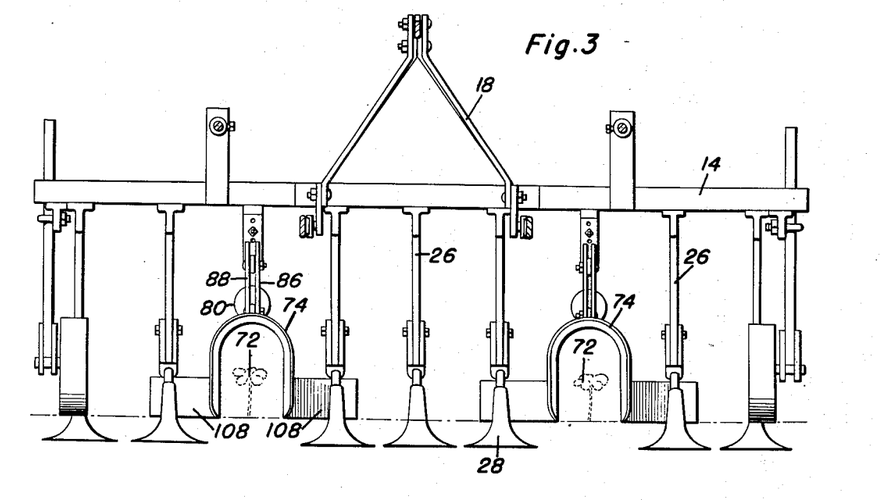
Figure 3 is a sectional view taken substantially on the plane of section line 3—3 of Figure 2.
Figure 4:
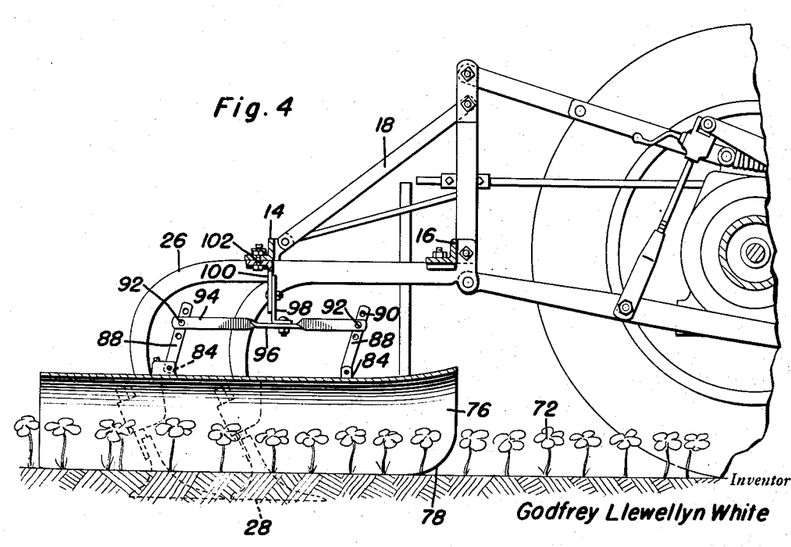
Figure 4 is an enlarged sectional view taken substantially on the plane of section line 4—4 of Figure 2.

In practical operation, the actuation of the raising and lowering means 20 will lower the plows, the spray shoes 50 and the shields 74 so that the shields 74 will loosely embrace and straddle the rows 72 of cotton, as shown clearly in Figure 2. Upon forward movement of the prime mover 10, the plows will dig up the soil between adjacent rows of cotton, an area known as the "middles," while the shields 74 will prevent clods and dirt dug up by the plows from being thrown into the cotton drills and against the cotton rows 72. At the same time, the rearwardly divergent plates 108 will level a predetermined area, preferably 5'', on both sides of the cotton row. In the modification just described, the spray shoes and adjustable spray nozzles 66 are carried at the forward end of the prime mover and accordingly, the spraying is done in advance of the plowing, shielding and leveling operation. It will be understood, however, that the spraying operation can be carried on to the rear of the shields, if desired.

Figures 7, 8:
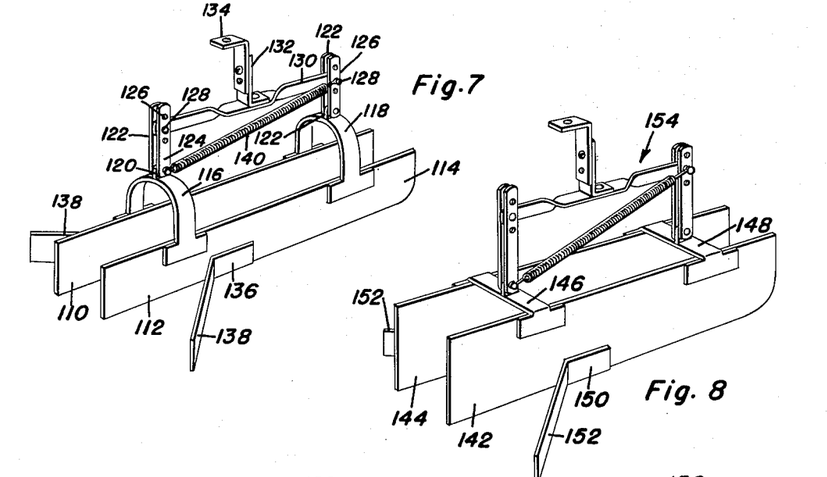
Figure 7 is a perspective view of a modification of a detail of the invention.
Figure 8 is a perspective view of another modification of a detail of the invention.

In the modification shown in Figure 7, the shield includes a pair of spaced, parallel, elongated vertically extending plates 110 and 112 which have arcuate forward portions 114. The plates 110 and 112 are adapted to straddle a plurality of cotton plants in the rows 72 and are secured together at their top edges by arcuate bars or ties 116 and 118 which are arched high enough to substantially clear the tops of the cotton plants. The ties are provided with apertured lugs 120 and 122, to each of which is pivoted a pair of vertically extending parallel links 122 and 124. Adjacent the upper edges of the links apertures 126 are provided for adjustably receiving pivot pins 128 which pivotally receive the ends of a horizontally extending bar 130 to the medial twisted portion of which is secured an L-shaped bracket 132. Secured to the bracket 132 is another L-shaped bracket 134 which is adapted to be secured to one of the transverse bars 14 of the cultivator frame 12.

Secured as by welding adjacent the bottom edge and approximate the rear edge of both plates 110 and 112 is a pair of vertically extending leveling plates 136 which have rearwardly diverging portions 138. The primary distinction between this shielding and leveling device and the shielding and leveling device 74 described previously is that the device illustrated in Figure 7 is not a continuous arcuate shield but made up rather of relatively short plates 110 and 112 secured together by arcuate ties 116 and 118 which straddle the cotton plants. Furthermore, the shielding and leveling device illustrated in Figure 7 does not include a weight 80 but rather an elongated compression spring 140 which extends diagonally between the links 122, 124 on both ends of the shield, the compression spring being secured at one end to the lowermost portion of the link 124 and secured at its other end to the other link 124 adjacent its upper end. Thus the present shielding and leveling device includes the parallel-acting links to keep the shields substantially level to the ground at all times and the compression spring 140 tends to resiliently retain the shield adjacent the soil. This shield is also secured to the cultivator frame between the plows and is used in conjunction with the adjustable spray heads which are carried at the forward portion of the prime mover.

The modification shown in Figure 8 is similar to that shown in Figure 7 except that relatively high, spaced parallel, elongated vertical plates 142 and 144 are provided which are adapted to straddle a plurality of cotton plants in a row and are secured together by horizontally extending ties 146 and 148 across their top edges. Secured as by welding to the outer surfaces of the plates 142 and 144 adjacent the bottom rear edges thereof are vertically extending, angulated leveling plates 150, which leveling plates include rearwardly divergent portions 152. The resiliently suspended parallel-acting links 154 employed for securing the high plates 142 and 144 to the cultivator frame 12 are identical with the construction shown in Figure 7 and hereinabove described. The major distinction between the shielding and leveling device of Figure 8 over that shown in Figure 7 is that the plates 142 and 144 are relatively high, approximately 10" to 12" high, as opposed to the plates 110 and 112 which are approximately 5" to 6" high. The shielding of the cotton plants in the row with the device shown in Figure 7 from the clods of dirt upturned by the plows is somewhat better than the shielding obtained with the relatively short plates 110 and 112.

Figure 9:
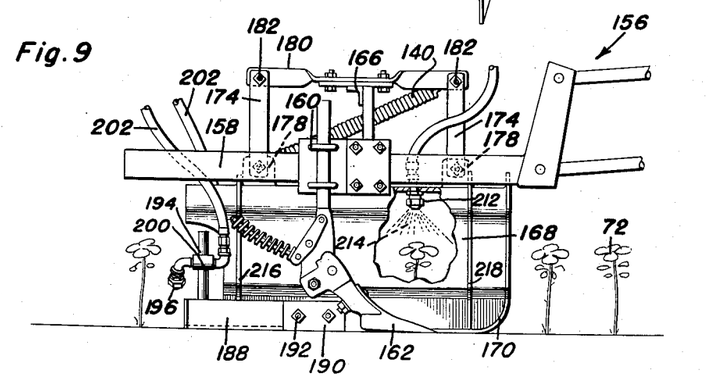
Figure 9 is a side elevational view, parts being broken away to show details of the construction, of another modification of a detail of the invention.
Figure 10:
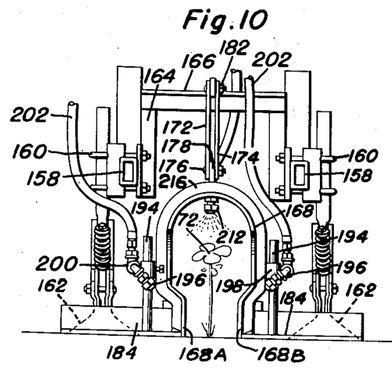
Figure 10 is a rear elevational view of the invention shown in Figure 9.
Figure 11:
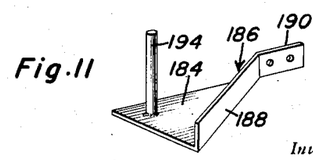
Figure 11 is a perspective view of the leveling mechanism employed in the device shown in Figures 9 and 10.
Figure 12:
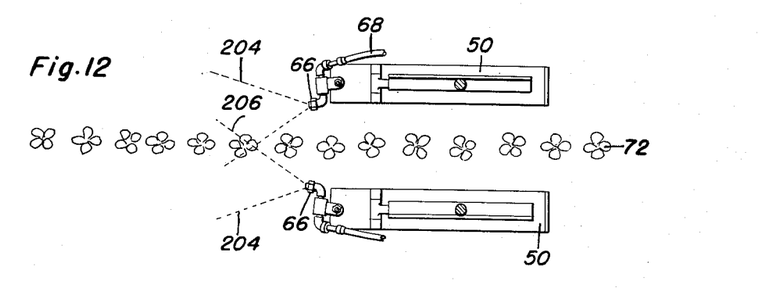
Figures 12 to 15 are elevational diagrammatic views illustrating the sequential steps employed in carrying out the method.
Figure 13:
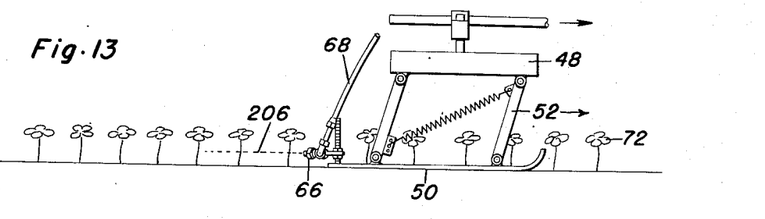
Figure 14:
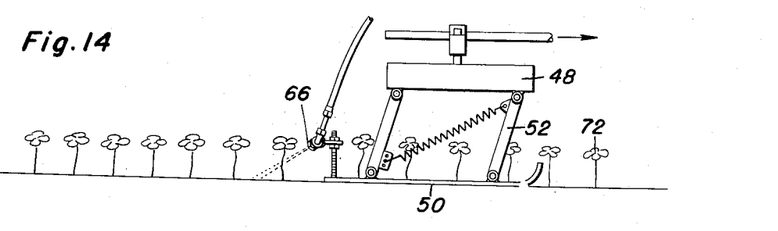
Figure 15:
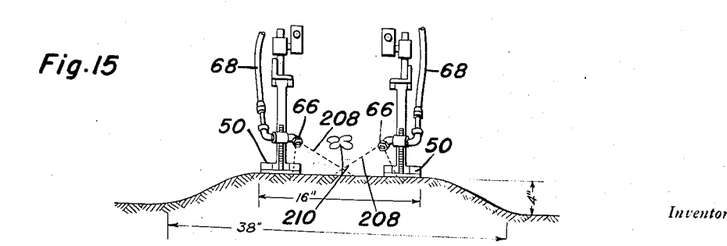

In the modification shown in Figures 9 to 11, a device is shown which simultaneously includes the shield, the leveling plates, the parallel-acting suspension mechanism, and the adjustable sprays. A portion of the raising and lowering linkage is shown at 156 and is operatively attached to a pair of longitudinally extending cultivator bars 158 to which are clamped as at 160 the shares of a pair of conventional plows 162. Secured between the cultivator bars 158 is a transversely extending U-shaped frame 164, the web portion of which is of angle construction as at 166.

Positioned between the plows is an elongated shield 168 including a pair of spaced parallel elongated vertically extending plates 168A, 168B, which are adapted to straddle and loosely embrace a plurality of cotton plants 72 in the row and secured by arcuate ties 216 and 218 which are upwardly arched to substantially clear the tops of the cotton plants, the forward edges of the shields 168 being provided with laterally extending arcuated shoes 170. The elongated arcuate shield 168 is secured by parallel-acting links to the frame portion 166. If desired shield 168 may include an upwardly arched, substantially arcuate plate portion embraced by ties 216, 218 and secured to the upper edges of plates 168A, 168B. A pair of vertically extending links 172 and 174 are provided which are spaced parallel to each other and which are pivoted as at 176 to a pair of apertured ears 178 secured upon the upper top surface of the shield as to the proximate top portions of the ties 216, 218 and preferably, as previously described, a spring 140 is provided extending diagonally from adjacent the upper end of the forward links to the lower portion of the rearward links. At their upper edges, each pair of spaced links 172 and 174 straddle the ends of a horizontally extending bar 180 and are pivoted to the ends as at 182. The bar 180 is welded or riveted to the frame member 166.

In this form of the invention the leveling device, as shown clearly in Figure 11, comprises a pair of horizontally extending V-shaped plates 184 which are welded to the bottom rear edges of both sides of the arcuate shield 168. The plates 184, instead of being welded, may be secured to the sides of the shield 168 in another manner. The V-shaped plates include vertical rims 186 which have a rearwardly diverging portion 188 and a horizontal portion 190 for receiving suitable bolts and closure nuts 192. Welded to the horizontal V-shaped plates 184 adjacent their rear edge are vertically extending rods 194 for a purpose soon to appear.

Spray nozzles 196 are provided having collars 198 which are slidably received upon the rods 194 and secured in adjusted vertical position on the rods 194 by means of suitable set screws (not shown). The spray nozzles also include collars 200 for retaining the nozzles in adjusted angular position on the rods 194. The spray nozzles are connected by suitable conduits 202 to a reservoir retaining a suitable herbicide, it being understood that the reservoir will be secured by any suitable means upon the prime mover. Thus it will be seen that in this form of the invention, the shielding, leveling, plowing, and spraying takes place virtually simultaneously with the spray nozzles in the rear of the plows and the leveling plates. When this device is pulled by the prime mover across the field, the plows 162 dig up the weeds in the "middles" and throw clods of dirt against the shield 168 which prevents the clods of dirt from entering the cotton drill. At the same time, the levelers 184 level a predetermined area, approximately 5", on both sides of the cotton drill and as the leveling takes place, the weed killer is sprayed through the adjustable spray nozzles 196 into the drill and upon the bottommost portions of the stems of the cotton plants.

As stated earlier, for the proper eradication of annual weeds in cotton cultivation, a potent weed killer must be employed which is very often toxic to the cotton plants if it impinges upon the buds or foliage of the cotton plants. Therefore, the sprays must be delivered in a particular pattern as shown clearly in Figures 12 to 15. In the first application, the spray nozzles must be adjusted at a level as close to the ground as possible and directed inwardly to produce fan-shaped sprays 204 which overlap only slightly as at 206 at the cotton drill, the spray impinging only upon the bottommost portions of the cotton stems. As the cotton grows in height, the spray nozzles are adjusted vertically and are directed downwardly and inwardly on the cotton drill to produce a downwardly directed vertical fan-shaped spray 208 which overlaps slightly as at 210 on the drill. In this manner the weed killer impinges only on the cotton stems adjacent the soil and does not strike the cotton plant above the cutin or on the bud or leaves.

Thus a novel method and apparatus are provided for completely eradicating annual and perennial weeds in cotton, which can be applied to very young cotton, which protect the cotton from destruction and which prevent the growth of weeds in a predetermined area on both sides of the cotton drill. If desired, the shielding and leveling device may be used also for eradication of insects by attaching a spray nozzle 212 to the top of the shield 158, the nozzle extending into the shield and delivering an insect spray 214 on the tops of the cotton plants as shown clearly in Figures 9 and 10.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims. Thus, for example, the present method and apparatus may be adapted for use in connection with such crops as soybeans, carrots, cabbage, cauliflower, dill, greenbeans, and like crops.

Having described the invention, what is claimed as new is:

1. In combination with a tractor having a cultivator frame at its rear end and a means for adjustably raising and lowering said frame, a means for controlling weeds in cotton comprising plows secured to said frame, cotton plant shielding means disposed between said plows, means for suspending said shielding means from said frame, means carried by the rearward portions of said shielding means for leveling a predetermined area on both sides of the cotton row, and adjustable spray nozzles for delivering a weed killer to the cotton row, said spray nozzles being supported by said levelling means and being directed toward said cotton row rearwardly of said shielding means to deliver said weed killer along the cotton row within said predetermined levelled area.

2. An apparatus for controlling weeds in cotton comprising a means for shielding cotton plants in a row, means for suspending said shielding means from a cultivator frame, means carried by said shielding means for leveling a predetermined area on both sides of the cotton row, and adjustable spray means for delivering a weed killer to the cotton row, said spray means being mounted on said levelling means to trail said shielding means and being directed inwardly toward said predetermined levelled area to deliver said weed killer to said cotton row and adjacent levelled areas.

3. An apparatus for controlling weeds in cotton comprising a means for shielding cotton plants in a row, means for suspending said shielding means from a cultivator frame, means carried by said shielding means for leveling a predetermined area on both sides of the cotton row, and adjustable spray means for delivering a weed killer to the cotton row, said shielding means including an elongated arcuate plate adapted to straddle and clear a plurality of cotton plants in the row, said suspending means including inter-connected parallel-acting links pivoted to said shielding plate and adapted to be attached to a cultivator frame, said leveling means including flat, horizontal V-plates each secured to said shielding plate adjacent its lower rear end, a vertical rod carried by said V-plate, and said spray means including nozzles and means for retaining each nozzle in adjusted position on said vertical rod.

4. Apparatus for use with a cultivator frame in controlling weeds in cotton, comprising a pair of substantially vertically disposed shield members alined longitudinally of the apparatus and transversely spaced apart to straddle cotton plants in a row, a pair of leveller portions respectively joined to said shield members, said leveller portions comprising vertically disposed plate-like portions diverging outwardly and rearwardly from their respective junctions with said shield members away from the alinement of said shield members, nozzle means adjustably mounted on said apparatus adjacent the rearmost portions of said leveller portions, said nozzle means being deflected rearwardly and inwardly toward a row of cotton plants straddled by said apparatus, said leveller portions being disposed in ground contact to level ground adjacent a straddled said row in advance of said nozzle means, whereby to remove obstructions from the inward and rearward deflection of said nozzle means, means for supplying spray liquid to said nozzle means, and means for suspending said apparatus from a cultivator frame.

5. Apparatus for use with a cultivator frame in controlling weeds in cotton, comprising a pair of substantially vertically disposed shield members alined longitudinally of the apparatus and transversely spaced apart to straddle cotton plants in a row, a pair of leveller portions respectively joined to said shield members, said leveller portions comprising vertically disposed plate-like portions diverging outwardly from their respective junctions with said shield members away from the alinement of said shield members, nozzle means adjustably mounted on said apparatus adjacent the rearmost portions of said leveller portions, said nozzle means being deflected rearwardly and inwardly toward a row of cotton plants straddled by said apparatus, said leveller portions being disposed in ground contact to level the ground adjacent a straddled said row in advance of said nozzle means, whereby to remove obstructions from the inward and rearward deflection of said nozzle means, and means for suspending said apparatus from a cultivator frame, the latter said means including parallel acting link means coupled to said shield members for hinged movement relative thereto and adapted for pivotal attachment to a cultivator frame.

6. Apparatus for use with a cultivator frame in controlling weeds in cotton, comprising a pair of substantially vertically disposed shield members alined longitudinally of the apparatus and transversely spaced apart to straddle cotton plants in a row, a pair of leveller portions respectively joined to said shield members, said leveller portions comprising horizontally disposed, substantially V-shaped plates, vertically disposed plate-like portions secured to the outer edges of said V-shaped plates and diverging outwardly from their respective junctions with said shield members, and means for suspending said apparatus from a cultivator frame.

7. In combination with a tractor having a cultivator frame, apparatus for controlling weeds in cotton comprising a pair of shield members arranged in substantially parallel alinement fore and aft of said tractor and transversely spaced apart to straddle cotton plants in a row, a pair of leveller portions respectively joined to said shield members rearwardly of the forward ends of said shield members, said leveller portions comprising vertically disposed plate-like portions diverging from their respective junctions with said shield members, outwardly and rearwardly away from said shield members, nozzle means adjustably mounted on said apparatus adjacent the rearmost portions of said leveller portions, said nozzle means being deflected rearwardly and inwardly toward a row of cotton plants straddled by said apparatus, said leveller portions being disposed in ground contact to level ground adjacent a straddled said row in advance of said nozzle means, and means suspending said apparatus from said cultivator frame.

8. In combination with a tractor having a cultivator frame, apparatus for controlling weeds in cotton comprising a pair of shield members arranged in substantially parallel alinement fore and aft of said tractor and transversely spaced apart to straddle cotton plants in a row, a pair of leveller portions respectively joined to said shield members, said leveller portions comprising vertically disposed plate-like portions diverging from their respective junctions with said shield members, outwardly and rearwardly away from said shield members, nozzle means adjustably mounted on said apparatus adjacent the rearmost portions of said leveller portions, said nozzle means being deflected rearwardly and inwardly toward a row of cotton plants straddled by said apparatus, said leveller portions being disposed in ground contact to level ground adjacent a straddled said row in advance of said nozzle means, whereby to remove obstructions from the inward and rearward deflection of said nozzle means, and means suspending said apparatus from said cultivator frame, said suspending means including parallel acting link means coupled to said shield members for hinged movement relative thereto and pivotally attached to said cultivator frame.

9. In combination with a tractor having a cultivator frame, apparatus for controlling weeds in cotton comprising a pair of shield members arranged in substantially parallel alinement fore and aft of said tractor and transversely spaced apart to straddle cotton plants in a row, a pair of leveller portions respectively joined to said shield members rearwardly of the forward ends of said shield members, said leveller portions comprising substantially V-shaped horizontal plates, vertically disposed plate-like portions secured to the outer edges of said V-shaped plates and diverging from their respective junctions with said shield members, outwardly and rearwardly away from said shield members, and means suspending said apparatus from said cultivator frame.

10. In combination with a tractor having a cultivator frame at its rear end and a means for adjustably raising and lowering said frame, a means for controlling weeds in cotton comprising plows secured to said frame, cotton plant shielding means disposed between said plows, means for suspending said shielding means from said frame, means carried by said shielding means for levelling a predetermined area on both sides of the cotton row, and adjustable spray nozzles for delivering a weed killer to the cotton row, said shielding means including elongated plate means adapted to straddle and clear a plurality of cotton plants in the row, said levelling device including a pair of substantially V-shaped, flat, horizontally extending plates, each secured at one of its edges to said elongated plate means adjacent the rear lower edge thereof, said V-plate including an upstanding rim at its free edge facing one of said plows, and a vertical rod secured to said V-plate adjacent its rear end, each of said spray nozzles including a collar slidable on said rod and means for retaining said collar in adjusted position on said rod.

11. An apparatus for controlling weeds in cotton comprising a means for shielding cotton plants in a row, means for suspending said shielding means from a cultivator frame, means carried by said shielding means for levelling a predetermined area on both sides of the cotton row and adjustable spray means for delivering a weed killer to the cotton row, said shielding means including a pair of spaced parallel, vertically extending plates adapted to straddle a plurality of cotton plants in a row, ties interconnecting the upper ends of said plates, interconnected parallel acting links pivotally secured to said ties and adapted to be attached to a cultivator frame, said levelling means including a pair of substantially V-shaped, flat, horizontally extending plates, each secured at one of its edges to each of said vertical shielding plates adjacent its lower rear edge, said V-plate including an upstanding rim at its free edge opposite its secured edge and a vertical rod, said spray means including nozzles and means for retaining each nozzle in adjusted vertical position on said rod.

12. An apparatus for controlling weeds in cotton comprising a means for shielding cotton plants in a row, means for suspending said shielding means from a cultivator frame, and means carried by said shielding means for levelling a predetermined area along the cotton row, said shielding means including elongated vertical plates adapted to straddle and clear a plurality of cotton plants in a row, said levelling means including flat, horizontal V-plates, each secured to said shielding plates adjacent the lower rear end of said shielding plates.

GODFREY LLEWELLYN WHITE.

References Cited in the file of this patent

UNITED STATES PATENTS

| Number | Name | Date |
| --- | --- | --- |
| 213,948 | Simmons | Apr. 1, 1879 |
| 1,021,529 | Johnson | Mar. 26, 1912 |
| 1,021,530 | Johnson | Mar. 26, 1912 |
| 1,513,137 | Tarnok | Oct. 28, 1924 |
| 1,513,138 | Tarnok | Oct. 28, 1924 |
| 1,568,448 | Freeman | Jan. 5, 1926 |
| 1,584,254 | Tarnok | May 11, 1926 |
| 1,678,061 | Fowler | July 24, 1928 |
| 1,998,856 | Towt | Apr. 23, 1935 |
| 2,077,334 | Lebow | Apr. 13, 1937 |
| 2,327,204 | McLemore | Aug. 17, 1943 |
| 2,336,577 | Singleton | Dec. 14, 1943 |
| 2,357,141 | Singleton | Aug. 29, 1944 |
| 2,408,328 | McLemore | Sept. 24, 1946 |
| 2,592,097 | Younger | Apr. 8, 1952 |